United States Patent

[11] 3,602,338

| | | |
|---|---|---|
| [72] | Inventor | Martin J. Sherry<br>Dayton, Ohio |
| [21] | Appl. No. | 845,982 |
| [22] | Filed | July 30, 1969 |
| [45] | Patented | Aug. 31, 1971 |
| [73] | Assignee | The Joyce-Cridland Company<br>Dayton, Ohio |

[54] SAFETY DEVICE FOR VEHICLE LIFTS
10 Claims, 5 Drawing Figs.

[52] U.S. Cl. .................................................. 187/8.49
[51] Int. Cl. .................................................. B66f 7/00
[50] Field of Search .......................................... 187/8.47,
8.49, 8.5

[56] References Cited
UNITED STATES PATENTS
2,684,129  7/1954  Jaseph ........................... 187/8.49
2,956,644  10/1960  Green ............................ 187/8.49

*Primary Examiner*—Harvey C. Hornsby
*Attorney*—Dybvig & Dybvig

ABSTRACT: An elongate lever located inside of a nonrotating tube has a detent pin projecting through an aperture in the tube located just above floor level. Lowering of the nonrotating tube is prevented by the detent pin. The lever can be manually moved to a laterally spaced and lower position within the nonrotating tube to retract the detent pin. When so moved, a release pin supported by the lever projects through another aperture in the tube. The lever is spring returned to the first mentioned position upon lowering of the lift when the release pin engages the floor.

PATENTED AUG 31 1971
3,602,338
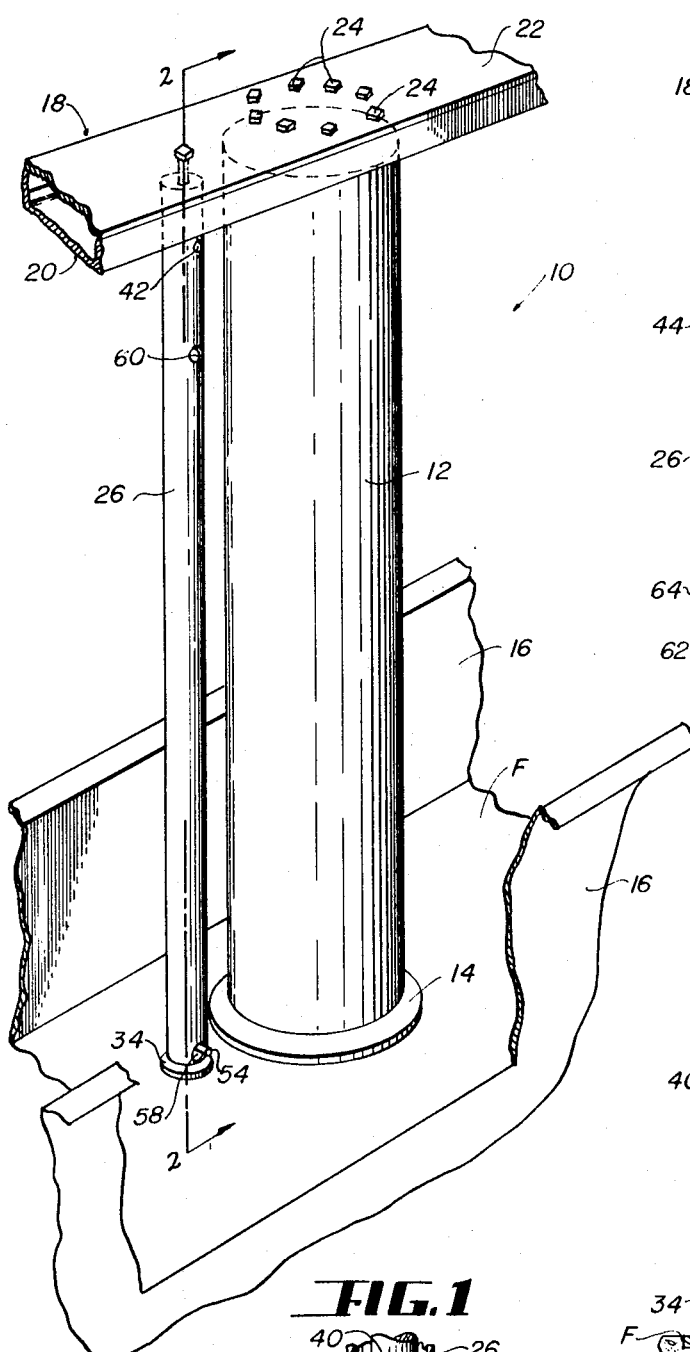
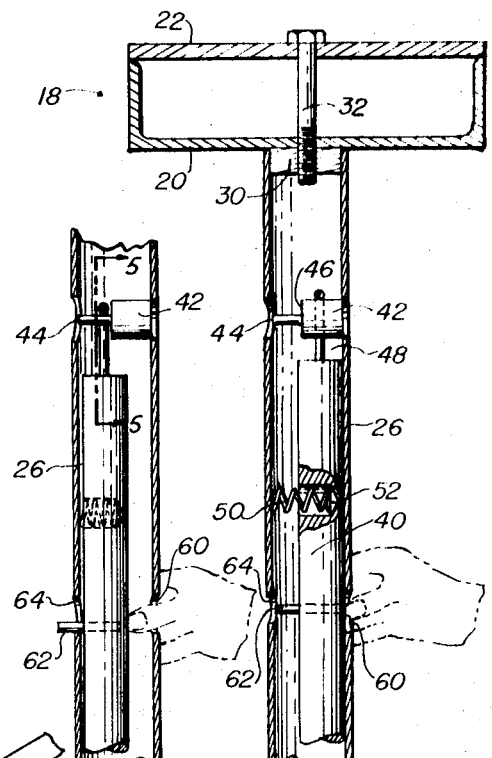
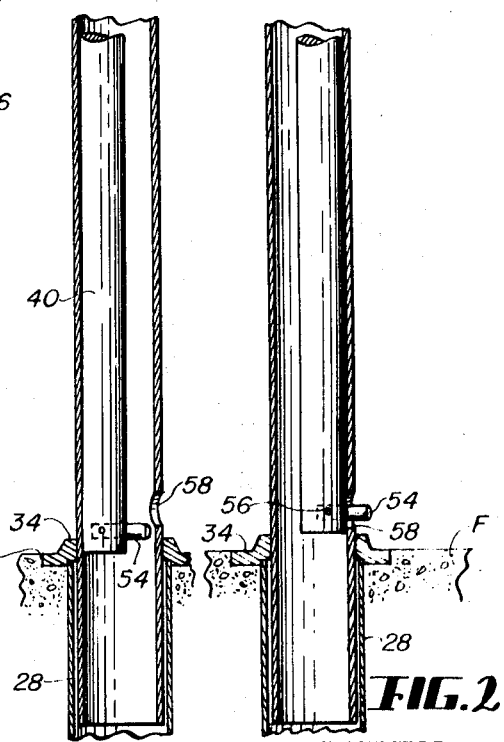
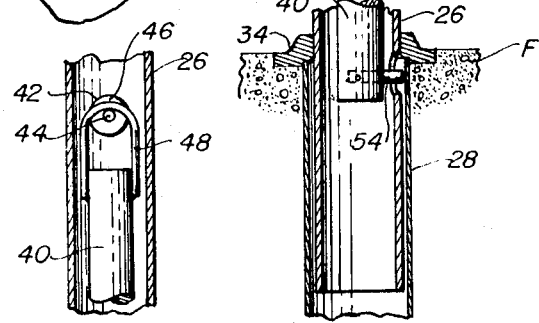
FIG.1
FIG.2
FIG.3
FIG.4
FIG.5
INVENTOR.
MARTIN J. SHERRY
BY
Dybvig and Dybvig
HIS ATTORNEYS

SAFETY DEVICE FOR VEHICLE LIFTS

This invention relates to a safety device for vehicle lifts and more particularly to a safety device for preventing accidental lowering of a lift from a raised position.

Several types of safety devices for preventing accidental lowering of a lift have been incorporated in nonrotating tubes. Many such devices are inconvenient to operate because they must be operated at or very close to the floor level. Some have pivotal or spring biased parts which, when the lift is lowered, are located close to the bottom of the housing for the nonrotating tube and thus are subject to the corrosive effects of liquids collecting at the bottom of the housing. Also many devices have parts which, after relatively short periods of use, become worn and useless for their purpose.

An object of this invention is to provide an improved safety device to prevent accidental lowering of a vehicle lift. More particularly it is an object of this invention to provide an inexpensive, positively operating safety device which is convenient to operate, rugged and long lasting.

In accordance with this invention a safety device is provided in association with a nonrotating tube. The safety device includes an elongate lever suspended in the nonrotating tube. The suspension is so constructed that the lever may be laterally moved in the tube from a first, operative, position in which a detent pin projects through an opening in the tube to a second, inoperative, position in which the detent pin is withdrawn or moved into the tube. In the second position, a release pin, which is located vertically higher than the detent pin, is projected out of the tube through another opening. Also in the second position the lever is suspended vertically lower than it is in the first position. When the lever is in the second position the lift can be lowered until the release pin engages the floor surrounding the tube. Continued lowering of the tube, therefore, results in a relative upward movement of the lever whereupon it can be suspended from the higher position within the tube. A spring engaging the lever laterally moves the lever to the first position when the lever is so relatively raised whereupon the release pin is retracted into the tube. When the lift is again raised, the detent pin thus automatically returns to its operative position.

Other objects and advantages will become apparent from the following description and the drawings in which:

FIG. 1 is a perspective view of a portion of a lift installation provided with the safety device of this invention;

FIG. 2 is a cross-sectional view as viewed in the direction of arrows 2—2 of FIG. 1 of a safety device and a portion of the lift and the housing for the nonrotating tube. FIG. 2 is on a larger scale than FIG. 1; hence the midportions of the safety device and nonrotating tube have been broken away;

FIG. 3 is a cross-sectional view similar to FIG. 2 but with additional parts broken away and showing the safety device in a different condition of operation from that shown in FIG. 2;

FIG. 4 is a cross-sectional view of a portion of the safety device and nonrotating tube near floor level as shown in still another condition of operation; and FIG. 5 is a cross-sectional view of a portion of the safety device taken in the direction of arrows 5—5 of FIG. 3.

Referring to the drawings in greater detail, a lift installation, generally designated 10, is illustrated in FIG. 1 comprising a jacking unit having a vertically movable piston 12 slidable within a cylinder 14 most of which is located below the ground or floor level indicated at F. The particular lift installation illustrated in FIG. 1 has a floor pit bounded in part by metal plates 16. Hence the floor F surrounding the cylinder 14 is in reality a subfloor or floor of the pit.

The vehicle lift installation 10 further includes a lift superstructure including a beam generally designated 18 consisting of a channel member 20 and a top plate 22 welded thereto which are connected to the top of the piston 12 as by bolts 24. The details of the mounting of the beam 18 to the piston 12 as well as the construction of the lift superstructure are unimportant to this invention and thus not illustrated or described herein.

The construction and operation of the jacking unit consisting of the piston 12 and cylinder 14 is also unimportant to this invention. Conventional hydraulic or semihydraulic jacking units may be employed. Because the piston 12 can rotate about its vertical axis within the cylinder 14 it is common practice to provide a device called a "nonrotating" device to prevent such rotation. The nonrotating device of this invention comprises a vertically oriented, hollow nonrotating tube 26 telescopically movable within the cavity of a tubular housing 28 embedded in the floor or ground adjacent the cylinder 14 (FIGS. 2-4). To connect the nonrotating tube 26 to the lift superstructure, a plug or cap 30 is welded in the top of the tube 26 and is centrally apertured to receive a bolt 32 which projects through the beam 18. The hollow tube 26 is guided in its vertical movement by a bearing collar 34 partially embedded in the floor F surrounding the tube 26 at the top of the tubular housing 28. The bearing collar 34 also minimizes the accumulation of liquids and other foreign materials within the tubular housing 28.

The construction of the vehicle lift installation 10 as thus far described may be entirely conventional. The nonrotating tube, because it is affixed to the superstructure on a vertical axis parallel to the vertical axis of the jacking unit, prevents rotation of the piston 12. In accordance with this invention the nonrotating tube 26 is modified and forms part of a safety device used to prevent accidental lowering of the lift should the jacking unit fail or should the controls therefor be accidentally actuated.

In addition to the tube 26, the safety device of this invention includes an elongate safety lever 40 suspended within the tube 26 for lateral sliding and pivotal movement therein. Referring to FIGS. 2, 3 and 5, the suspension support for the lever 40 comprises a larger diameter support stud 42 mounted transversely within the tube 26 near its upper end and a smaller diameter support stud 44 transversely projecting from the inner end face, designated 46, of the support stud 42. Connected to the upper end of the elongate lever 40 is a bail 48, the inverted bight portion of which overhangs either the stud 42 or the stud 44. As apparent the upper portions of the studs 42 and 44 provide two laterally and vertically spaced support surfaces, the inner end face 46 of the stud 42 constituting an abutment which, when the lever 40 is supported by the smaller diameter stud 44 as illustrated in FIG. 3, prevents lateral movement of the upper end of the lever 40 to the right.

In the operative position of the safety lever 40, it is supported by the larger diameter stud 42 on the right-hand side of the hollow tube 26 as viewed in FIG. 2. A coil spring 50 bearing against the inside face of the wall of the hollow tube 26 and projecting into a pocket 52 within the lever 40 urges the lever 40 into the position shown in FIG. 2 and tends to retain it in that position. A detent pin 54 connected to the lower end of the lever 40 as by a spring roll pin 56 projects generally horizontally through a detent opening 58 in the tube 26 slightly above floor level. So long as the lever 40 is in the position illustrated in FIG. 2, the nonrotating tube 26 can only lower to the point whereat the detent pin 54 is sandwiched between the floor or the top of the collar 34 and the upper edge of the detent opening 58. For reasons which will become apparent, the horizontal extent of the lever 40 and detent pin 54 is less than the inside diameter of the tube 26.

When it is desired to permit lowering of the lift and thus lowering of the nonrotating tube 26 into the housing 28, the lever 40 can be manually moved by inserting a thumb or suitable tool through an access opening 60 located at a convenient height above floor level. Compare the positions of the hand shown in phantom lines in FIGS. 2 and 3. When the lever 40 is laterally moved from the position shown in FIG. 2 to that shown in FIG. 3 it falls by gravity from its support by the stud 42 to its support by the stud 44. After the hand shown in FIG. 3 is removed to release the lever 40, the spring 50 is ineffective to return the lever 40 to the FIG. 2 position because the bail 48 is engaged with the inner end face 46 of the larger diameter stud 42 as shown in FIGS. 3 and 5. The lower end of the lever 40 will be pivoted to the right as viewed in FIGS. 2-4.

However, the support stud 44 is sufficiently smaller than the support stud 42 that the lever 40 drops sufficiently far that the free end of the detent pin 54 is lower than the detent opening 58. The detent pin 54, accordingly, is confined within the nonrotating tube 26.

Projecting from the side of the lever 40 opposite that side from which the detent pin 54 projects is a release pin 62. In the operative position of the lever 40 illustrated in FIG. 2, the release pin 62 is located within the margins of the nonrotating tube 26. When the lever 40 is laterally moved from that position shown in FIG. 2 to that shown in FIG. 3, the release pin projects through a release opening 64 which is diametrically opposed to and vertically higher than the detent opening 58. When the nonrotating tube 26 is lowered, the lever 40 lowers therewith until the release pin 62 engages the top surface of the collar 34. As the tube 26 continues to lower, the lever 40 is raised relative thereto. As soon as the lever 40 is raised sufficiently high to permit the bail 48 to slide over the larger diameter stud 42, the spring 50 pressing against the lever 40 returns the upper end of the lever 40 to the position thereof shown in FIG. 2. The lower end of the lever 40 cannot completely return to the position shown in FIG. 2 because the detent opening 58 and the detent pin 54 are now below ground level. The detent pin 54, therefore, projects slightly out of the opening 58 into engagement with the adjacent inside surface of the housing 28. This position of the lever 40 is possible because it is of a smaller diameter than the inside diameter of the tube 26 and because it is mounted by the bail 48 for both lateral sliding and pivotal movement. When the lift is again raised the detent pin rides along the inner surface of the housing 28 until the nonrotating tube 26 is returned to the position thereof shown in FIG. 2. FIG. 4 illustrates the position of the detent pin 54 and the "cocked" position of the lever 40 as the lift is being raised. The free end of the detent pin 54 is chamfered whereupon it can ride along the inner surface of the collar 34 as it is returning to the position thereof shown in FIG. 2.

The safety device of this invention is easily and inexpensively manufactured and assembled. The lever 40 can be made from a rod of rolled steel. The detent pin 54 is preferably a high strength, hardened steel which is connected to the lever 40 before assembly into the tube 26. The larger diameter stud 42 can be welded to an apertured wall portion of the nonrotating tube 26 where indicated and its inner end face 46 bored for receiving the smaller diameter stud 44. Before the smaller diameter stud 44 is assembled, the lever 40 with the detent pin 54 connected thereto is inserted into the hollow tube 26 and the bail 48 mounted upon the larger diameter stud 42. As the lever 40 is being inserted into the tube 26, the spring 50 can easily be forced into the picket 52 through the release opening 64. Thereafter the smaller diameter stud 44, which preferably is formed from a spring roll pin, is inserted in place at the same time as the spring roll pin forming the release pin 62 is inserted.

Having thus described my invention, I claim:

1. A combined nonrotating and safety device for a vehicle lift of the type having a superstructure raised and lowered with respect to a floor comprising: a hollow tubular housing embedded in the floor beneath said superstructure, a hollow tube connected to said superstructure and telescopically received within said housing, an elongate lever, support means within said tube suspending said lever for laterally slidable movement therein, a detent member connected to said lever and adapted to project through a detent opening in said tube slightly above floor level when the lift is raised, the horizontal extent of said detent member and said lever being less than the inside diameter of said tube whereby said lever may be laterally moved in said tube with said detent member retracted within said tube by lateral sliding movement of said lever, said tube having an access opening whereby said lever may be manually engaged and laterally moved to a position within said tube in which said detent member is retracted, and means for returning said lever to the position thereof whereat said detent member projects through said detent opening.

2. The apparatus of claim 1 wherein said support means has two laterally and vertically spaced support surfaces separated by a shoulder, said lever being supported by the vertically higher one of said support surfaces when said detent member projects outwardly of said tube and being supported by the lower of said support surfaces when said detent member is located within said tube, and wherein said means for returning said lever includes a release member projecting through a release opening in said tube when said lever is supported by said lower of said support surfaces, said release member engaging a part fixed in relation to the floor surrounding said tube as said tube lowers, and bias means engaging said lever.

3. The apparatus of claim 2 wherein said detent member is lower than said detent opening when said lever is supported by the lower of said support surfaces.

4. In a vehicle lift of the type having a jacking unit including a vertically movable lift piston and a superstructure connected to and vertically movable with said piston, a safety device for preventing accidental lowering of said superstructure from a raised position comprising a vertically oriented hollow tube connected to said superstructure and movable into a cavity in the floor adjacent said jacking unit, an elongate safety member housed within said hollow tube, support means within said hollow tube suspending said safety member therein, said support means having a first support surface supporting said safety member in a first position within said tube, a second support surface for supporting said safety member in a laterally spaced and vertically lower second position within said tube, and a shoulder between said first surface and said second surface; said hollow tube having a detent opening and said safety member having a detent member projecting through said detent opening when said safety member is in said first position, said hollow tube further having an access opening in the wall thereof whereby said safety member may be manually engaged and laterally moved from said first position whereupon said safety member drops to said second position, said detent member being withdrawn into said hollow tube as said safety member is moved from said first position to said second position, bias means engaging said safety member for retaining said safety member in said first position, and release means for raising said safety member relative to said tube when said tube lowers into said cavity, said bias means returning said safety member to said first position after said safety member is raised sufficiently by said release means.

5. The apparatus of claim 4 wherein said release means comprises a release pin projecting from said safety member and located above said detent member and projecting in the opposite direction from said detent member, said hollow tube further having a release opening through which said release pin projects when said safety member is in said second position, said release pin abutting a part fixed in relation to the floor adjacent said hollow tube as said tube lowers into said cavity whereupon said safety member is moved relatively upwardly within said tube.

6. The apparatus of claim 4 wherein said support means comprises a first stud welded to said hollow tube on the inside thereof, and a second stud connected to said first stud, and wherein said safety member is suspended from said support means by a bail connected to the upper end of said safety member.

7. The apparatus of claim 4 wherein said detent member is lower than said detent opening when said safety member is supported by said second support surface.

8. In a vehicle lift of the type having a superstructure raised and lowered with respect to a floor, a safety device including a vertically extending, hollow nonrotating tube connected to said superstructure for vertical movement therewith and slidable in a cavity in the floor to prevent rotation of said superstructure, a support mounted in said tube and having two laterally and vertically spaced support surfaces, an elongate lever, means connected to said lever suspending said lever from said support and freely pivotally mounting said lever within said tube, a detent pin connected to said lever adjacent its lower end and projecting out of an aperture in said tube closely adjacent the surrounding floor when the lift is raised and when said lever is suspended from the vertically higher one of said support surfaces, said detent pin coacting between the surrounding floor and said hollow tube to prevent substantial accidental lowering of said lift, bias means engaging said lever for retaining said lever in a position to be supported by said higher one of said support surfaces, said tube having an access opening whereby said lever may be manually engaged and laterally moved from said higher one of said support surfaces to the other, lower one of said support surfaces against the bias of said bias means whereupon said detent pin is moved into said nonrotating tube, said lever thereupon falling to said lower one of said support surfaces, and a release pin connected to said lever above said detent pin and projecting through an aperture in said tube when said lever is suspended from said lower one of said surfaces, said release pin projecting outwardly of said tube to be engaged by the floor as said lift is lowered, thereby to raise said lever relative to said tube upon continued lowering thereof, said bias means thereupon moving said lever into a location wherein it is again supported by said higher one of said support surfaces.

9. The apparatus of claim 8 wherein said nonrotating tube is telescopically received within a housing projecting into the floor, the free end of said detent pin engaging the inside surface of said housing after said bias means has returned said lever to its position of support by said higher one of said support surfaces while said detent pin is below floor level.

10. In a vehicle lift of the type having a superstructure raised and lowered with respect to a floor and having a vertically extending, hollow nonrotating tube connected to said superstructure and slidable in a cavity in the floor to prevent rotation of said superstructure, means for use with said nonrotating tube for preventing accidental lowering of said lift comprising an elongate lever, support means suspending said lever within said nonrotating tube, said support means having a pair of laterally and vertically spaced support surfaces, a detent member projecting from said lever adjacent its lower end, a release pin connected to said lever above said detent member and in the opposite direction from said detent member, said detent member being adapted to project through a detent opening in said tube when said lever is supported by the higher one of said surfaces and said release pin being adapted to project through another opening in said tube when said lever is supported by the lower one of said surfaces, and bias means within said tube biasing said lever toward the detent opening in said tube.